INVENTORS.
JACK R. RAGEN
PHILIP M. CROSNO
BY Alden D. Redfield
Charles M. Hogan
ATTORNEYS.

INVENTORS.
JACK R. RAGEN
PHILIP M. CROSNO
BY Alden D. Redfield
Charles M. Hogan
ATTORNEYS.

INVENTORS.
JACK R. RAGEN
PHILIP M. CROSNO
BY Alden D. Redfield
Charles M. Hogan
ATTORNEYS.

INVENTORS.
JACK R. RAGEN
PHILIP M. CROSNO,
BY Alden D. Redfield
Charles M. Hogan
ATTORNEYS.

INVENTORS.
JACK R. RAGEN
PHILIP M. CROSNO
BY Alden D. Redfield
Charles M. Hogan
ATTORNEYS.

TRACKING SYMBOL FOLLOWER

Filed Nov. 26, 1962 7 Sheets-Sheet 6

*INVENTORS.*
JACK R. RAGEN
PHILIP M. CROSNO
BY Alden D. Redfield
Charles M. Hogan
ATTORNEYS.

TRACKING SYMBOL FOLLOWER

Filed Nov. 26, 1962 7 Sheets-Sheet 7

INVENTORS.
JACK R. RAGEN
PHILIP M. CROSNO
BY Alden D. Redfield
Charles M. Hogan
ATTORNEYS.

3,158,858
TRACKING SYMBOL FOLLOWER
Jack R. Ragen and Philip M. Crosno, Cincinnati, Ohio, assignors to Avco Corporation, Cincinnati, Ohio, a corporation of Delaware
Filed Nov. 26, 1962, Ser. No. 240,070
18 Claims. (Cl. 343—5)

The present invention relates to target tracking and display systems and is of particular utility as applied to an alpha-numeric display system for air traffic control.

In the situation in which a plurality of blips indicative of a plurality of targets (i.e., moving aircraft) appears on a single plan position indicator (PPI) display device, visual observations of the pictorial display on the radar screen do not usually afford an adequate basis for making separate decisions involving the separate targets. Therefore, as typified by the copending United States patent application of Philip M. Crosno and Frank L. Wedig, Jr., Serial No. 72,066, filed in the U.S. Patent Office on November 28, 1960, and assigned to the assignee of the present application and invention, tracking systems have been devised so that data relating to specific targets indicated on a PPI presentation may be identified by displayed symbols.

The provision of such symbols involves a number of problems. One problem is the maintenance of an upright attitude of the symbol. It will be recalled by those familiar with this art that, in systems utilizing a flying spot scanner to accomplish presentation of the symbol on a plan position indicator (PPI) by intensity modulation, a tracking symbol uprightly designating a given target at 0° of azimuth (i.e., North) will be inverted when the target moves to 180° of azimuth (i.e., South), for example, unless special provision is made for preventing such inversion. Now, there is shown in the aforementioned Crosno and Wedig patent application one means, including a rotating mechanism, for maintaining rectitude of the symbol, regardless of the position of the specific target being displayed, identified, and "labeled." One of the objects of the present invention is to accomplish rectitude of symbol presentation in an improved, entirely electronic manner.

It is also an object of the invention to provide an entirely new system for coordinated scanning of a flying spot scanner and a PPI device.

A further object of the invention is to provide means for rendering the displayed alpha-numeric symbol of constant size regardless of range.

Another object of the present invention is to provide an improved modular-type device or accessory for causing the symbol to be displayed and to track the target indication.

The invention also includes among its objects an improved combination of elements for placing an alpha-numeric symbol on the corresponding target indication.

Yet another object of the invention is to provide means for varying the size of the target position tracking gate in accordance with target range.

Further objects of the invention include the provision of simplified circuitry directed to the fulfillment of the previously stated objects.

The present invention possesses additional advantages in that provision for manual assist of automatic tracking is available in the event of radar signal fade.

In accordance with the invention there is provided the combination (FIG. 1) of: a PPI target display device 31 having a radial sweep and beam intensity control means; a flying spot scanner device 34 having horizontal and vertical deflecting elements and a scanned medium 35 having a radiation transmission characteristic pattern and a video output circuit 32, 33 coupled to said beam intensity control means; and means for coordinating the display of a target sector and the display of the scanned medium on the PPI device, comprising: a first storage device 63 for providing a stored X voltage, a second storage device 64 for providing a stored Y voltage, means 46 synchronized (by 44) with the PPI radial sweep to provide resolved sweeps $R \sin \theta$ (FIG. 6) and $R \cos \theta$ (FIG. 4), a first comparator 55 for comparing the resolved sweep $R \sin \theta$ and the stored X voltage to effectively convert the resolved sweep $R \sin \theta$ into horizontal deflection modulation waves (FIGS. 14, 15, 16) for the flying spot scanner substantially as each sweep $R \sin \theta$ traverses the level of the X stored voltage, and a second comparator 56 for comparing the resolved sweep $R \cos \theta$ and the stored Y voltage to effectively convert the resolved sweep $R \cos \theta$ into vertical deflection modulation waves (FIGS. 8, 9, 10) for the flying spot scanner substantially as each sweep $R \cos \theta$ traverses the level of the Y stored voltage, where the X stored voltage is the analog of the horizontal position of the display of the scanned medium on the PPI target display device, the Y stored voltage is the analog of the vertical position of the display of the scanned medium on the PPI target display device, R is the range parameter of the radial sweep, and $\theta$ is the instantaneous azimuthal position of the radial sweep.

The invention further embraces: the combination as just described, together with means 52 responsive to the coincident operation of both comparators to provide a target position tracking gate, and error detector means 54, 77, 78 for measuring the deviations of target echo signals from time symmetry with respect to the target position tracking gate and applying to the voltage storage devices corrections requisite to maintain such symmetry.

In addition, the invention provides means (shown in FIG. 21) for varying the width of the target gate in accordance with target range.

Viewed more broadly, the invention comprises, in combination: a PPI target display device having a radial sweep and beam intensity control means; a flying spot scanner having horizontal and vertical deflecting elements and a scanned medium having a radiation transmission characteristic pattern and a video output circuit coupled to said beam intensity control means; and means for angularly synchronizing the flying spot scan and those portions of the PPI sweep covering a sector.

For a better understanding of the present invention, together with other and further objects, advantages, and capabilities thereof, reference is made to the following description of the accompanying drawings, in which:

FIG. 1 is an electrical schematic diagram, in block form, of a preferred form of tracking symbol follower system in accordance with the invention;

FIGS. 2, 4, and 6 are amplitude-time curves of the following wave forms, respectively: the repetitive range sawtooth reference voltage, the resolved sweep or Y coordinate voltage $kt \cos \theta$, and the resolved sweep or X coordinate voltage $kt \sin \theta$;

FIGS. 3, 5, and 7 are, respectively, exploded fragments of the FIGS. 2, 4, and 6 curves, each corresponding to the circled portions thereof;

FIGS. 8, 9, 10, 11, 12, and 13 postulate that the target being followed and symbolized is located in the second quadrant (i.e., the second quadrant swept by the beam, starting from 0° at North), with a negative Y coordinate, and—on such postulate—these figures respectively show the following wave forms:

FIG. 8—the target Y coordinate voltage in relationship to the memorized or stored target Y voltage;

FIG. 9—the voltage wave form applied to one of the vertical deflecting elements of the flying spot scanner;

FIG. 10—the voltage wave form applied to the other vertical deflecting element;

FIGS. 11 and 12—expanded curves corresponding to FIGS. 9 and 10, respectively;

FIG. 13—the signal applied to the target position tracking gate from the Y comparison system;

FIGS. 14, 15, 16, 17, 18, and 19 again postulate that the target tracking symbol is in the second quadrant, with a positive X coordinate, and these figures respectively show the following wave forms:

FIG. 14—the target X coordinate voltage in relationship to the memorized or stored target X voltage;

FIG. 15—the voltage wave form applied to one of the horizontal deflecting elements of the flying spot scanner;

FIG. 16—the voltage wave form applied to the other horizontal deflecting element;

FIGS. 17 and 18—expanded curves corresponding to FIGS. 15 and 16, respectively;

FIG. 19—the signal applied to the target position tracking gate from the X comparison system;

FIG. 20 is a skeleton outline of the face of the PPI indicator device showing a target echo in the first quadrant and the positions of X and Y gates which track the target, symbolized by "A4," the two gates defining a zone in which a designated tracked target echo appears as a blip, the intensity modulaiton of the PPI control electrode being such that a symbol element appears in such zone whenever it is traversed by the radial sweep of the PPI, such intensity modulation coming from a flying spot scanner system described below;

Figure 1:
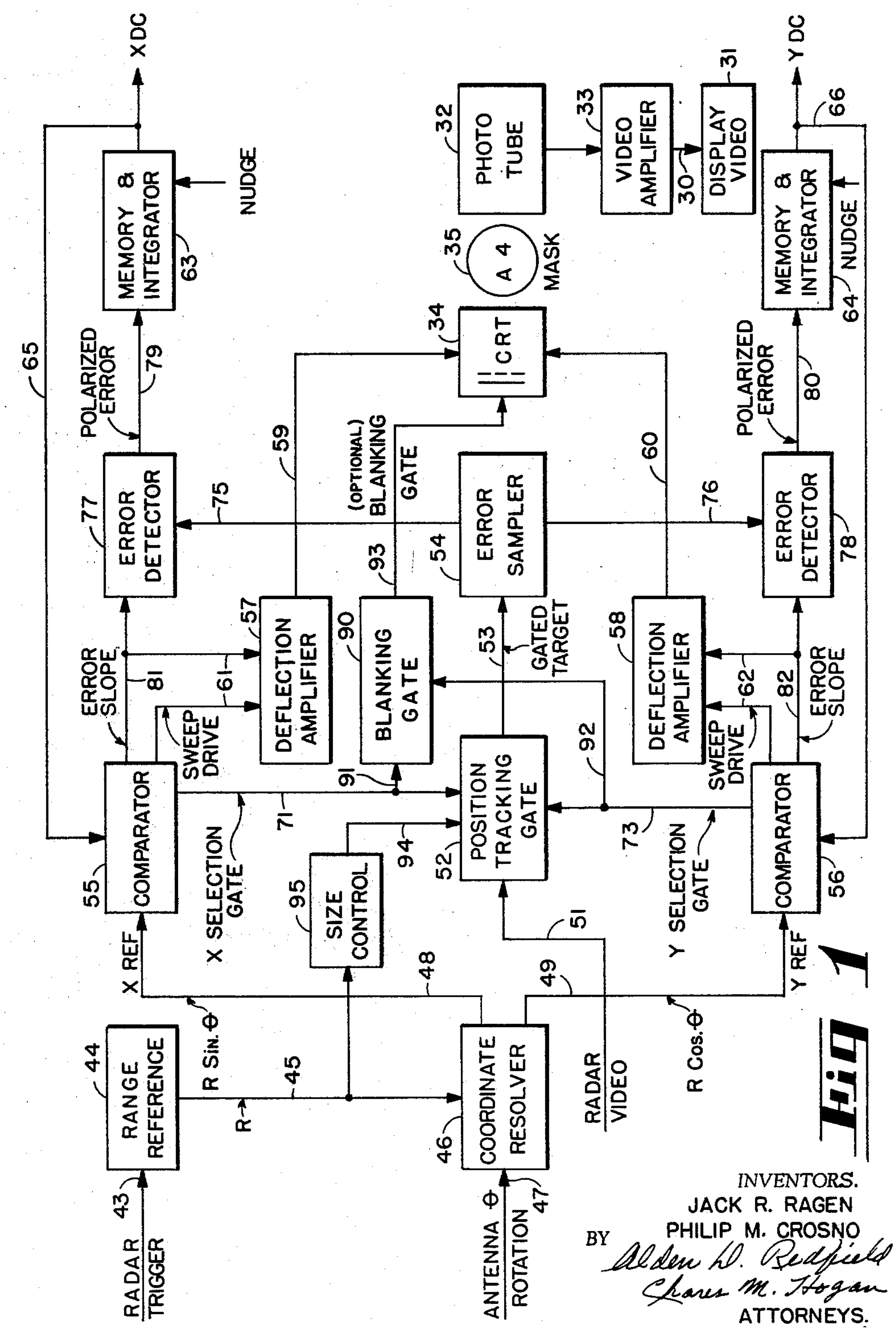

One of the advantages of the invention is its embodiment in a "black box" or accessory form which may easily be installed in existing air traffic control equipment, without substantial modification. Accordingly, the description of the invention assumes certain environmental equipment which need not be described in detail herein but is mentioned in explaining the utility of the invention.

For example, the reference numeral 30 in FIG. 1 indicates the input to a conventional plan position indicator (PPI) radar display device 31, hereinafter referred to as the "main PPI." Such a display device is commonly included among the equipments located in air traffic control centers. A PPI is an intensity-modulated type of cathode ray tube device in which the range and bearing of one target or a plurality of targets are presented in analog form—i.e., polar coordinates. The PPI is a part of a pulse type radar system which further includes a transmitter, an antenna, and a receiver. The transmitter comprises a master pulse generator which initiates radio frequency bursts of energy transmitted to the antenna. A radar triggering device in the receiver is synchronized with the master pulse generator in such a way as to mark the instant $t_0$ of time at which each radio frequency burst is propagated.

The radar triggering device initiates the generation of a sawtooth range reference whenever a burst in sent out from the transmitter, thus providing a time base. When the transmitted energy "hits" a target (such, for example, as an airplane in the path of the transmitted signal), reflected or echo energy is returned from the target to the antenna and displayed at the receiver as a "blip." The receiver also includes a PPI device, and the sawtooth range reference is used to control the scansions of the PPI device in such a way that the beam of the cathode ray tube of the PPI starts from the center of its screen when the transmitted burst is propagated, and the beam is swept radially and intensity-modulated when the target echo is received, the distance from the center of the screen to the blip or video presentation of the echo signal indicating the range of the target in analog form. The orientation or azimuth position of each successive sweep is accomplished by a synchronizing linkage between the antenna and a resolver included in the sweep-producing circuits of the PPI in such a way that the angular direction of the PPI sweep corresponds to the bearing of the antenna, and that angular direction, during display of a blip, corresponds to the bearing of the target.

The above elementary discussion of radar and PPI displays is incorporated herein only to establish antecedents for the discussion of the invention, and it is neither necessary nor desirable to disclose herein the details of this fundamental background.

Accordingly, reference is simply made to the following publications for a complete description of a PPI display per se: Principles and Practice of Radar, Penrose and Boulding, sixth edition, pp. 359–361, Van Nostrand, Princeton, New Jersey, 1959; Airborne Radar, Povejsil, Raven and Waterman, pp. 616–619, Van Nostrand, Princeton, New Jersey, 1961; Radar System Engineering, Ridenour, pp. 440–441 and 532–544, McGraw-Hill, New York, 1947; Encyclopedia on Cathode Ray Oscilloscopes and Their Uses, Rider and Uslan, pp. 493–494, John F. Rider, New York, 1950.

For the reasons stated, the invention postulates the availability of a PPI display, and the discussion will assume that there are a plurality of target blips on that display and that one particular target has been selected for symbolizing. Since a plurality of targets may individually be symbolized in the same manner as one, the discussion is confined to one as representative.

What the present invention does is to cause to be displayed on the PPI scope an identifying symbol, in proximity to the blip, which constitutes the video display of the target so identified. The invention is called a "Tracking Symbol Follower" because it further causes the symbol always to follow or track the target blip, thereby furnishing identification of the target throughout the movements of the target and the analog type display of that target. The video information requisite to this positioning and tracking action of the symbol is electronically applied, via line 30, to an intensity-modulating electrode of the PPI device 31. The target echo is effectively "painted" on the screen by intensity modulation of the PPI beam, causing it to brighten to display a luminous spot. So too, the symbol is likewise produced by intensity modulation. The invention functions in such a way that, as several successive sweeps of the PPI beam traverse a narrow assumed zone surrounding the target echo, thus displaying the target, the beam is also intensity-modulated to display the symbol. That is to say, the symbol is displayed on a gate zone, and the target is displayed in that zone.

The intensity modulation productive of the displayed symbols appears in a phototube 32. This phototube is coupled to a video amplifier 33 having an output circuit 30, in such a way that the intensity modulations are applied to the PPI device 31. Physically disposed between a flying spot scanner tube 34 and phototube 32 is a symbol mask or transparency 35. This mask is interposed in the path of light transmission between the screen of scanner tube 34 and light-sensitive device 32 in such manner that when the screen of tube 34 is scanned, light from the luminous spot appearing thereon is transmitted from tube 34 to phototube 32, modulating the latter in accordance with the gradations of light and dark involved in the traversal of such light across the mask 35. It should be understood that the mask is only one form of scanned medium having a radiation transmission characteristic pattern, and the invention is not limited to symbol transfer or transfer using a mask or any particular mask.

Mechanically, the elements 30, 32, 33, 34, and 35, taken collectively, constitute a conventional flying spot scanner.

Flying spot scanners are per se well known to those skilled in the art, and are commonly disclosed in the literature—for example, in Electronic and Radio Engineering, Terman, fourth edition, pp. 986–987, McGraw-Hill, New York, 1955; Television, Zworykin and Morton, second edition, pp. 259–261, John Wiley & Sons, Inc., New York, 1954; Television Engineering, Fink, second edition, pp. 91–95, McGraw-Hill, New York, 1952; Elements of Television Systems, Anner, pp. 204–208, Prentice-Hall, Inc., New York, 1951; Encyclopedia on Cathode Ray Oscilloscopes and Their Uses, Rider and Uslan, pp. 839–840, John F. Rider, New York, 1950; Pulse and Digital Circuits, Millman & Taub, p. 544, McGraw-Hill, New York, 1956.

Figure 20:
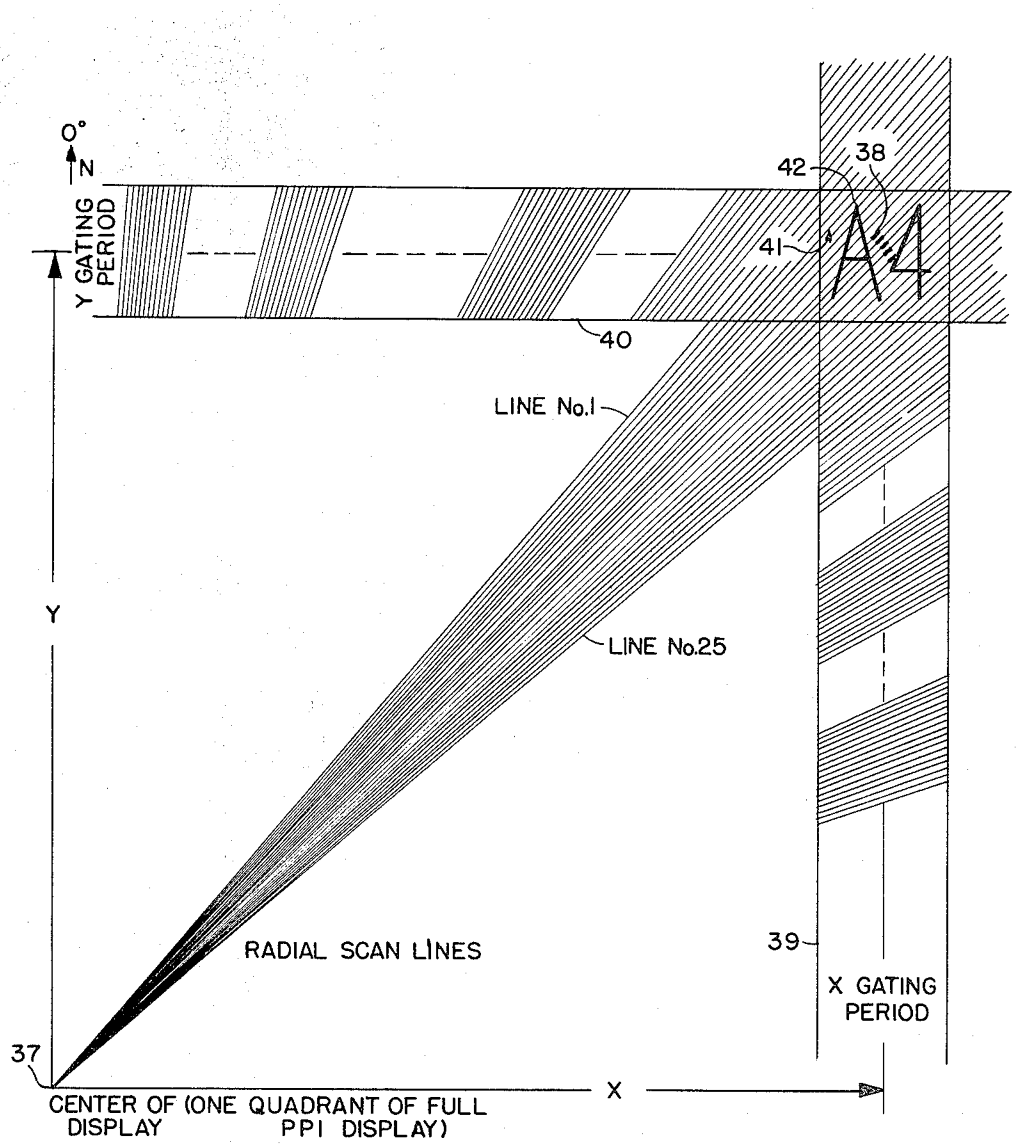

Reference is first made to FIG. 20 in a brief explanation as to "how the invention works." This figure shows the first (upper right-hand) quadrant of a conventional PPI display device, the point marked 37 being the center thereof and the spot 38 representing a selected one of a plurality of targets which may be shown on the display device. As the target indicated by the blip 38 moves in range and azimuth, the blip 38 accordingly moves. This blip is produced by intensity modulation of the PPI device. What the invention accomplishes is to cause the blip to be identified by a superimposed tracking symbol here shown as "A4." The PPI beam is intensity-modulated to display the symbol when the beam is traversing the time band 39 designated "X GATING PERIOD" and at the same time traversing the time band 40 designated by the legend "Y GATING PERIOD." The intersecting portions of those gating periods are definitive of a target position gate or zone 41 which is made to track the target blip, thus designating the target.

Figure 22:
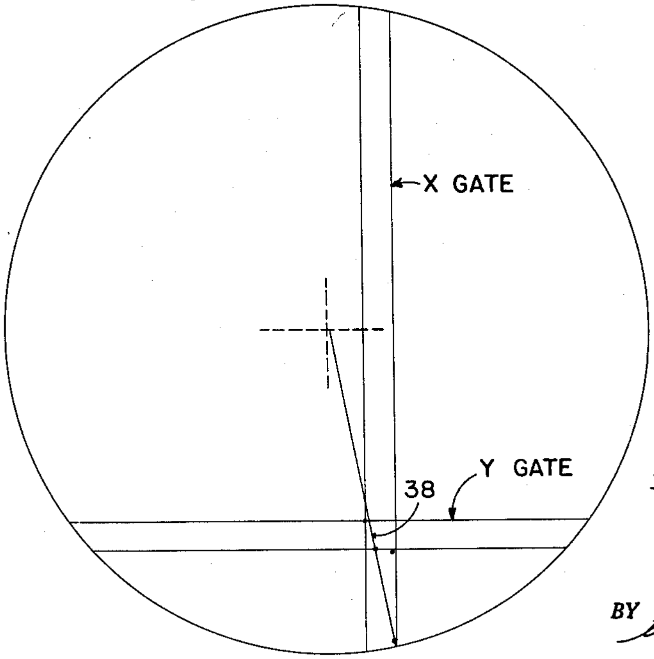
FIG. 22 is a showing of the face of the PPI indicator device with a target echo in the second quadrant (i.e., the second one swept, conventionally designated the fourth in trigonometry)

Now, video signals representative of the symbol "A4" are produced by the flying spot scanner device 34, 35, 30, 32, 33. In accordance with the present invention this device is operated in a manner similar to an off-center PPI device. Its scansions are coordinated with the scansions of the PPI device 31 in such a way that, as the lines beginning with Line No. 1 traverse the PPI zone designated 41 in FIG. 20, the screen of the flying spot scanner device is accordingly scanned. The same is true of each of the illustrative lines, Line No. 1 . . . Line No. 25. The video information from the flying spot scanner is modulated onto the PPI device, so that the latter not only displays the target 38 in sector 41, but also displays the symbol "A4," for example, the latter being time-defined within the gate 41 and therefore superimposed on the target blip 38. The target of FIG. 20 being in the first quadrant, the coordinated scansions aforementioned are upwardly and to the right. On the other hand, the target represented in FIG. 22 is in the second quadrant, so that for such a target the coordinated scansions would be downwardly and to the right.

In the above-mentioned Crosno and Wedig patent application Serial No. 72,066, the symbol mask is effectively mechanically synchronized in azimuth with the antenna, thus assuring upright transfer of the symbol to the main PPI display at all times. One aspect of the present invention is that the raster of the flying spot scanner is electronically turned in lieu of mechanical rotation of the symbol mask or transparency.

From the foregoing it will be apparent that it is essential that the scansions of the flying spot scanner be synchronized with the scansions of the PPI device. This follows from the fact that a flying spot scanner operates so that the light reaching the phototube at any instant is that transmitted by a single picture element of the transparency. Referring to FIG. 20, it will be understood that, when the beam of the PPI is at point 42, for example, which corresponds to the apex of the "A," the intensity modulation applied to the PPI from the flying spot scanner must be such as to cause the PPI beam to signify that apex. Since the flying spot scanner transmits only one element at a time, it follows that the beam of the flying spot scanner tube 34 at that instant should be just traversing the apex of the letter "A" on mask 35. Thus the two beams are synchronized as to angular position.

Figure 7:
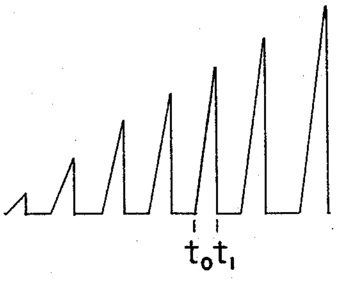
Figure 8:
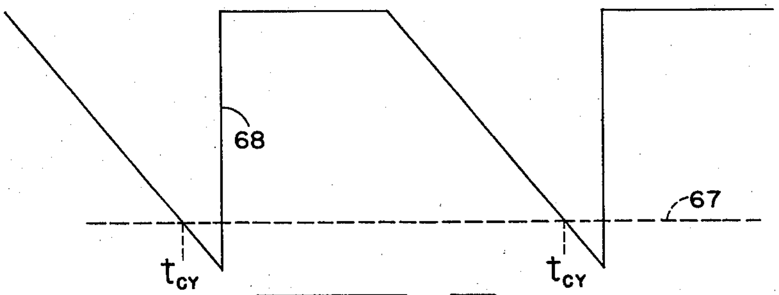
Figures 14, 15, 16, 17, 18, 19:
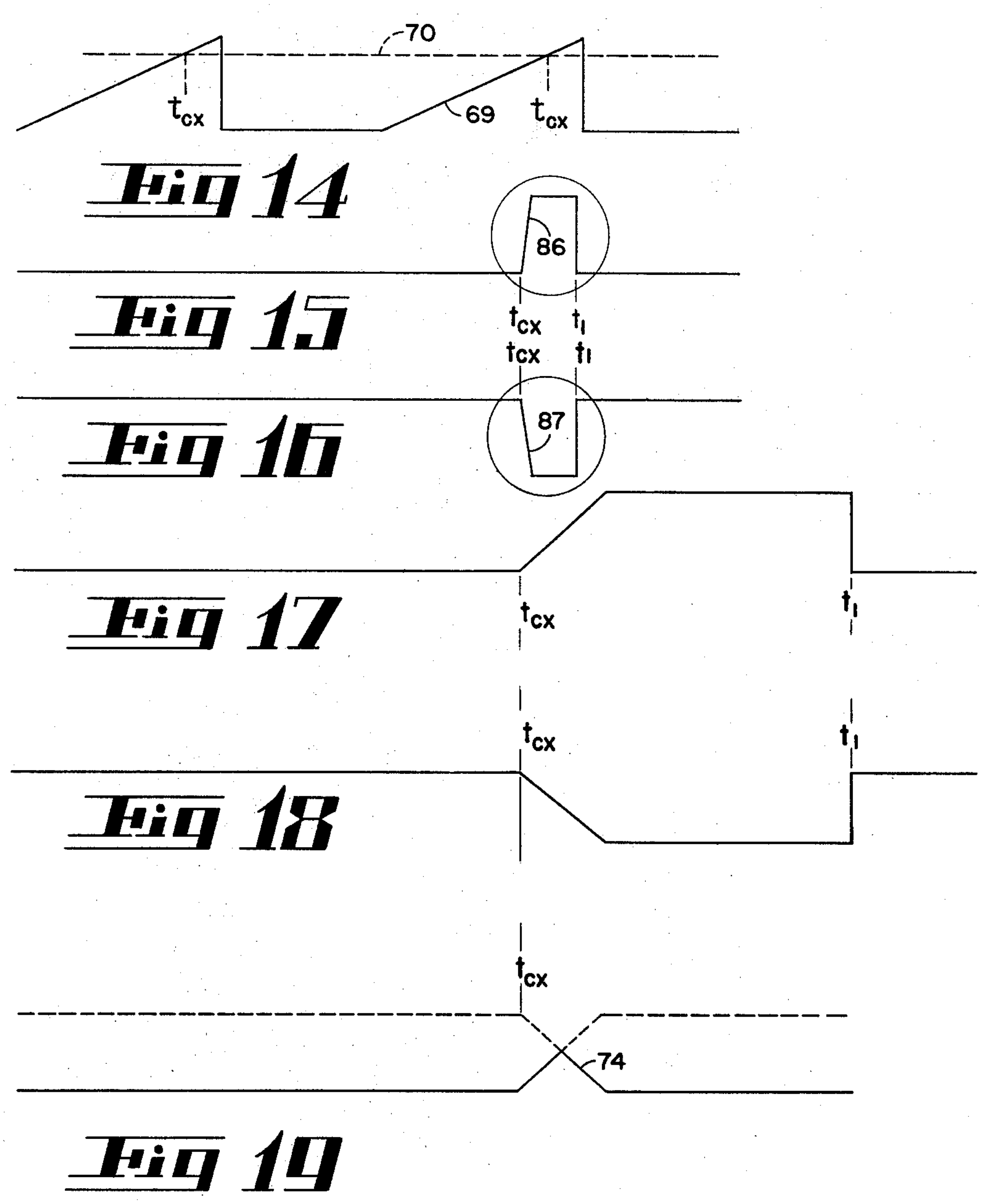

At this point attenton is invited to two factors:

(1) The area of the symbol is small with regard to the area of the PPI screen, so that the indication of the former occupies only a fraction of the latter;

(2) The PPI sweep is operating at all times, but the flying spot scanner scansions have a relatively short duty cycle in the sense that they do not begin at the origin of the principal time base—i.e., at time $t_0$ (see FIGS. 3, 5, and 7), but they begin substantially at times $t_{cx}$ and $t_{cy}$ (see FIGS. 14 and 8).

Essentially the scansions of the flying spot scanner are the resultant of two delayed resolved sweeps, and the discussion now proceeds to the means and method by which such delays are accomplished.

In accordance with standard radar practice, there is provided a radar trigger output circuit 43 coupled to the input of a range reference device 44, the function of which is to develop a radial range sweep of approximately sawtooth wave form. In order to resolve this radial sweep into its Cartesian coordinate components, the output line 45 of the range reference device 44 is applied to the input of a coordinate resolver 46. The angular position datum of the antenna (i.e., $\theta$) is mechanically supplied to the resolver by an input 47. The resolver 46 functions in conventional manner to supply on output line 48 the resolved sweep $kt \sin \theta$, or $R \sin \theta$, and to supply on output line 49 the resolved sweep $kt \cos \theta$, or $R \cos \theta$. Although the outputs at 48 and 49 are not applied directly to the PPI scope 31, it will be understood that resolved sweeps of like character could be utilized to provide the two required deflecting signals for the PPI scope. For purposes of the present invention, it is not material which of several prior art methods for operating the PPI scope is employed. Suffice it to say that the outputs at 48 and 49 are representative of the types of deflection voltages that could be employed.

Figure 2:
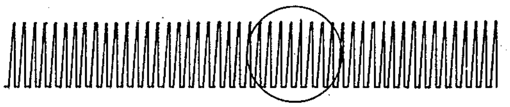
Figure 3:
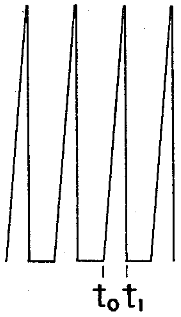

The range reference wave forms are shown in FIG. 2, and an enlarged portion of FIG. 2 is illustrated in FIG. 3. The modulated Y coordinate voltage wave forms are correspondingly shown in FIGS. 4 and 5, and the X coordinate modulated wave forms are shown in FIGS. 6 and 7. At this point it is emphasized that the range reference wave form, repetitiously shown in FIG. 3, is identical to the range reference employed for the PPI presentation. For the reasons stated, the PPI and the flying spot scanner are synchronized in direction. The scansions of the PPI are controlled directly by the time base illustrated in FIG. 3, and the scansions of the flying spot scanner are controlled indirectly (i.e., with delays discussed below) by that time base.

The operations of the elements 43, 44, 45, 46, 47, 48, and 49 and their interrelations need not be further described herein, because that subassembly of elements is well known to those skilled in the art, as developed in the following literature: Pulse and Digital Circuits, Millman and Taub, pp. 537–541, McGraw-Hill, New York, 1956; Radar System Engineering, Ridenour, pp. 440 and 532–545, McGraw-Hill, New York, 1950.

As indicated, the PPI display is both intensity-modulated (by the target echo video and by the flying spot scanner) and deflection-modulated, whereas the flying spot scanner 34 is only deflection-modulated, the two deflection modulations being in synchronism when the intensity modulation occurs.

Figures 23, 24, 25, 26:
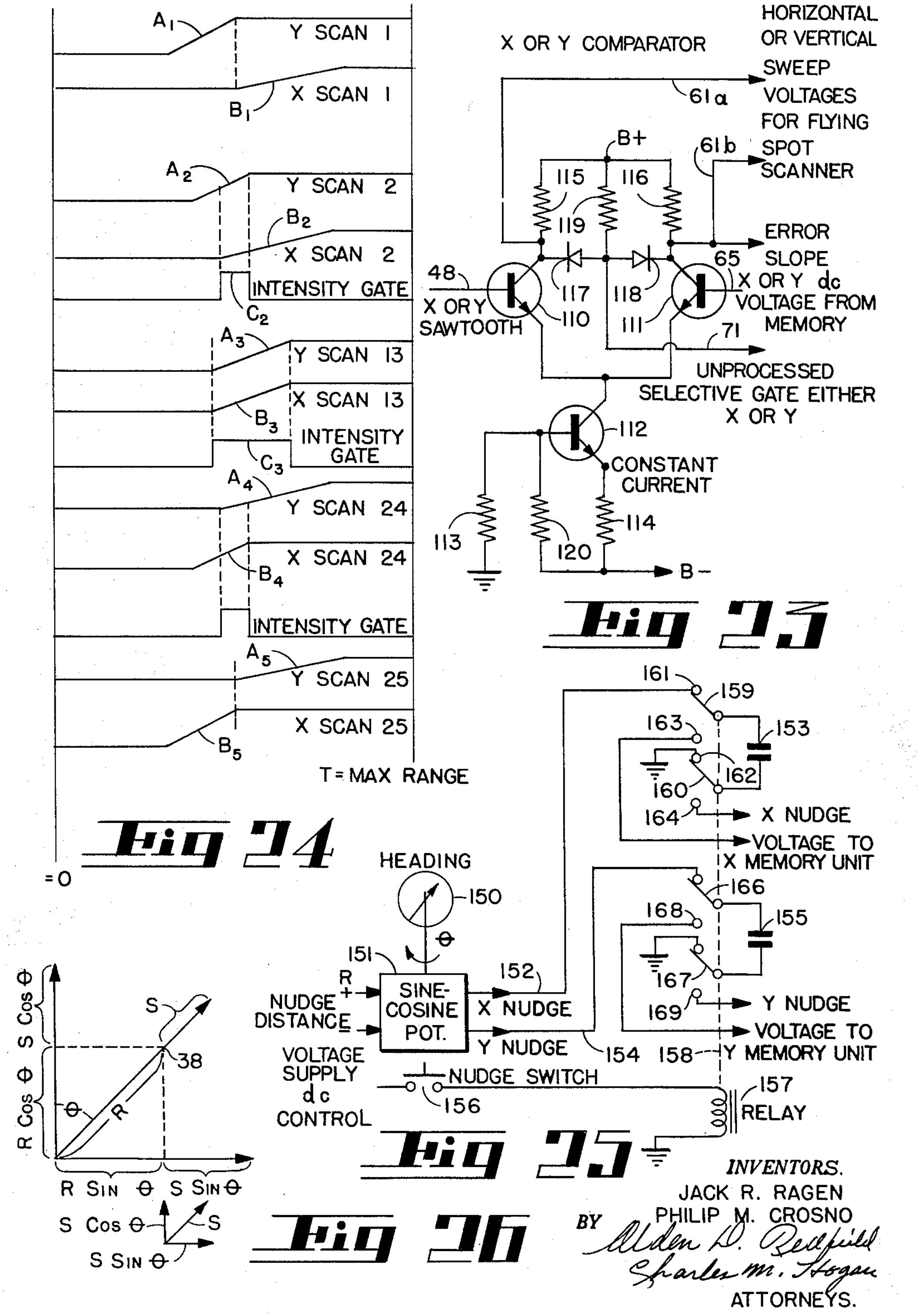
FIG. 23 is a schematic diagram of a suitable comparator device in accordance with the present invention.
FIG. 24 is a set of curves utilized in explaining the operation postulated in FIG. 20, this set being broken down into five groups and used for purposes of illustration, as explained hereinbelow.
FIG. 25 is a circuit schematic of a "nudge" circuit suitable for manual placement of a symbol on target.
FIG. 26 is a vector diagram used as an aid in describing the operation of the invention.

To explain how this is accomplished, let the point 38 in FIG. 26 represent the same target illustrated in FIG. 20. The target blip position 38 is, as indicated on the PPI device, vectorial, and is the resultant of two components, $R \sin \theta$ and $R \cos \theta$ at the instant of blip display. Now, when the sweep on the PPI scope reaches out radially substantially to point 38, then it is desirable to initiate the flying spot scanner sweep. Note that, for the desired coordination, the flying spot scanner sweep should be in the direction indicated by the vector S, which is continuous with the vector R. Note further that the flying spot scanner sweep is initiated by a vertical deflection component $S \cos \theta$ and a horizontal component $S \sin \theta$ at substantially (i.e., just before) the time of target echo display. The significance of this is as follows: (1) the flying spot scanner sweep has the same directional attributes as the PPI sweep and is synchronized therewith; (2) the initiation of the vertical component of the flying spot scanner sweep is delayed, relative to the PPI sweep, by a time functionally related to $R \cos \theta$, the Y coordinate of the selected target; (3) the initiation of the horizontal component of the flying spot scanner sweep is delayed by a time functionally related to $R \sin \theta$, the X coordinate of the selected target.

The delays are accomplished by comparing the Y and X coordinate voltages with stored Y and X voltages of such magnitude that, when the Y coordinate voltage is equal to the stored Y voltage, then Y or vertical deflection currents are initiated in the flying spot scanner, and, when the X coordinate voltage is equal to the stored X voltage, then X or horizontal deflection currents are initiated in the flying spot scanner. During the time when both X and Y deflection currents are applied to the flying spot scanner, it transfers the symbol to the PPI. When electrostatic deflection elements are used, X and Y deflection voltages are of course employed.

Figure 13:
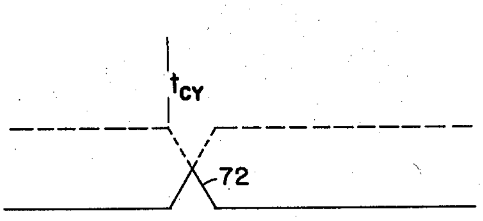

The stored X and Y voltages characterize a selected target, in the sense that they determine where the symbol will appear on the PPI. Even when several targets appear on the PPI device, one is selected, for purposes of the present discussion, by storing X and Y voltages in suitable memory devices 63 and 64. The magnitudes and polarities of these stored voltages depend on the range of the selected target (as displayed) and the quadrant in which it is located (as displayed). For a target in the first quadrant, both stored voltages are positive, for example. For a target in the second quadrant as hereinabove defined, the stored X voltage is positive and the stored Y voltage is negative. These voltages provide levels so that the X and Y comparators 55 and 56, respectively, can "tell" when the corresponding coordinate voltages are equated to the respective stored voltages. The coincidence of both equating actions or satisfied comparisons controls a target position tracking gate 52 and confines the error sampling of target echo video signals to those from the selected target. The gate 52 is closed to video information from all targets other than the one designated by the X and Y selection gate pulses in lines 71 and 73 (FIG. 1). These pulses are shown in FIGS. 19 and 13, respectively. The flying spot scanner transfers the symbol to the PPI display during the overlap of X and Y gates.

It is reiterated that the target echo pulses traverse gate 52 at substantially the same instant at which sweep drives 61 and 62 initiate flying spot scanning in device 34. This operation is accomplished by making two continuous comparisons.

In order to make the two essential comparisons, there are provided X and Y comparator circuits 55 and 56 and deflection amplifiers 57 and 58. Deflection amplifier 57 is coupled by suitable outputs collectively designated by numeral 59 to the horizontal deflecting elements of scanner 34, and deflection amplifier 58 is similarly coupled by circuits collectively designated by numeral 60 to the vertical deflecting elements of scanner 34. The deflection amplifier inputs are coupled by circuitry 61 and 62, respectively, to suitable drive circuitry included in the X and Y comparators 55 and 56, respectively. These arrangements are made in such manner that, as the position tracking gate 52 opens to pass video (i.e., for a time inclusive of the time that the target is being displayed on PPI 31), the scansions of the flying spot scanner are initiated. In other words, to a rough approximation, whenever the radial sweep of the PPI is substantially sufficiently removed from its origin to begin to indicate the selected target, then simultaneous deflections in the flying spot scanner are initiated.

In a broad sense, the comparators 55 and 56 convert the stored X and Y voltages into signals which ultimately cause the symbol to be positioned in a predetermined location. That is, the target which will be identified by a given symbol is selected by the stored X and Y voltages.

Let us assume that the function of the system here disclosed is simply to display a brightness element on or near the target blip. Assume also that the flying spot scanner is intensity-modulated only. Then the stored X and Y voltages would determine where that brightness element would be placed on the PPI. The purpose of the comparisons performed by the elements 55 and 56 would be to determine when the brightness element is so placed. The "when" is the time at which the target is being displayed. Therefore the target display characteristic $R \sin \theta$ is compared with the symbol display characteristic or stored X voltage, and the target display characteristic $R \cos \theta$ is compared to the symbol display characteristic or Y stored voltage, so that, when the target display characteristics agree with the symbol display characteristics (i.e., when both comparisons are satisfied), the comparators tell the flying spot scanner that the "when" has arrived. Now, this paragraph postulates a simple single brightness element displayed on or near a target blip. The operation of the invention is more complex, in that the symbol transfer provided by it consists of the transfer of all of the elements of the symbol, so that the flying spot scanner is deflection-modulated (not intensity-modulated) and does considerably more than simply transfer a single-element brightness indication, as herein explained. The flying spot scanner transfers information to the PPI during and throughout each traversal of the PPI beam across the zone 41 (FIG. 20), for example. What is accomplished here is dynamic transfer of the symbol elements to the PPI display, accomplished by a flying spot scanner operating in angular synchronism with the PPI display.

In a more specific sense, therefore, the comparators convert into deflection signals for the flying spot scanner the excess of $R \sin \theta$ over the stored X voltage, and the excess of $R \cos \theta$ over the stored Y voltage.

Assuming for the moment a selected target and the provision of a memory and integrating device 63, there is placed in that device the stored X voltage (70, FIG. 14). The stored Y voltage (67, FIG. 8) is similarly placed in memory and integrating device 64. The X storage device 63 has an output circuit which is coupled by line 65 to the X comparator device 55, whereby the level of the stored voltage is supplied to comparator 55. Similarly, the output of Y memory device 64 is coupled to an input of the Y comparator 56 by a line 66, so that the level of the stored Y voltage is supplied to the comparator 56.

The X comparator 55 compares the values of the sinusoidal resolved sweep appearing in line 48 and the voltage level 70 (FIG. 14) appearing in line 65 and indicates satisfaction of a comparison whenever $R \sin \theta$ is equal to such level.

The Y comparator 56 compares the values of the cosine resolved sweep appearing in line 49 and the voltage level 67 (FIG. 8) and indicates satisfaction of a comparison whenever $R \cos \theta$ is equal to such level.

Figure 4:
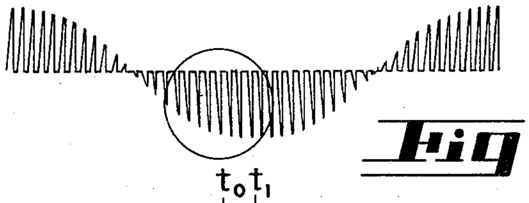
Figure 5:
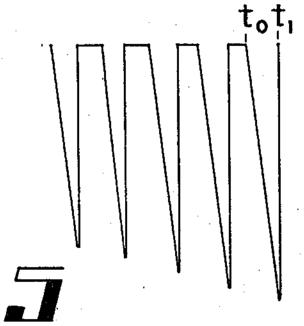
Figure 6:
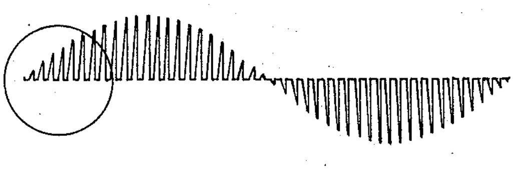

Referring now to FIGS. 4, 5, and 8, and postulating a target in the second quadrant, the dashed line 67 represents the voltage level of the Y stored voltage input to comparator 56. The wave forms 68 represent the cosine-modulated resolved sweep. It will be seen from an examination of FIGS. 4, 5, and 8 that the cosine-modulated range reference or resolved sweep 68 traverses line 67 at instants $t_{cy}$, dependent on the level 67 and characterized by a particular slope of the wave form dependent on the cosine of the azimuthal position of the target.

Similarly, now making reference to FIGS. 6, 7, and 14, the sine-modulated resolved sweep, indicated by the reference numeral 69, traverses the level 70 of the stored X voltage in device 63 at instants $t_{cx}$, dependent on the level 70 and characterized by a slope of wave form 69 dependent on the sine of the azimuthal position of the target.

At instants $t_{cy}$, as shown in FIG. 8, the Y comparison is satisfied—i.e., the Y coordinate voltage in line 49 is equal to the stored Y voltage in line 66. Similarly, at instants $t_{cx}$ illustrated in FIG. 14, the X comparison is satisfied, the X voltage stored in line 65 being equal to the X coordinate voltage in line 48.

When both X and Y comparisons are satisfied, then both horizontal and vertical deflection voltages are applied to scanning device 34.

The discussion to this point has been on the footing that the flying spot scanner vertical and horizontal deflecting wave slopes begin at the center of the Y and X gating periods (FIG. 20)—i.e., at the instants the Y and X comparisons are satisfied. This is because the levels 67 and 70 do correspond to the central lines of the Y gating period and the X gating period. However, the vertical and horizontal scans of the flying spot scanner are made in practice to begin as the PPI beam traverses lines 40 and 39, respectively, at time slightly earlier than times $t_{cy}$ and $t_{cx}$ of FIGS. 8 and 14. The error detectors are in practice proportioned to operate so that the apexes of the wave forms 72 and 74 are made to correspond to the times of the satisfactions of the two separate comparisons. That is to say, the apex of wave form 74 and the apex of wave form 72 in fact are made to occur at times $t_{cx}$ and $t_{cy}$, respectively. The slopes of wave forms 86 and 87 are accordingly phase-advanced with respect to $t_{cx}$, and the slopes of wave forms 83 and 84 are phase-advanced with respect to $t_{cy}$. The slopes of wave forms 74, 86, and 87 start at the same time, ahead of $t_{cx}$. The slopes of wave forms 83, 84, and 72 also start simultaneously, ahead of $t_{cy}$. While FIGS. 9 through 13 and FIGS. 15 through 19 equate the $t_{cy}$ and $t_{cx}$ they employ to the $t_{cy}$ and $t_{cx}$ shown in FIGS. 8 and 14, respectively, for purposes of explaining the principles of operation, in practice it is desired to start the vertical and horizontal deflections of the flying spot scanner as the PPI beam enters the Y and X gate zones, respectively, and therefore the slopes of the wave forms of FIGS. 9–13 and 15–19 begin in actual practice at instants earlier than those shown. It is reiterated that, in practice, the peak of 72 in FIG. 13 occurs at the same instant as $t_{cy}$ in FIG. 8. Further, the peak of 74 in FIG. 19 occurs at the same instant as $t_{cx}$ in FIG. 14.

The satisfaction of both comparisons occurs during a coincidence interval, in the middle of which the position tracking gate 52 passes target video information to the sampler device 54. That is to say, echo signals are applied via input line 51 to a position tracking gate circuit 52, the operation of which is such as to pass the video signals through the gate output circuit 53, to an error sampler device 54 suitably coupled to the gate 52, when the two comparisons are satisfied.

The discussion now proceeds to the circuitry for keeping the symbol on the target.

Comparator 55, at the time that the first comparison is satisfied, applies through output line 71, which intercouples it to gate 52, an X selection pulse 74 in the form illustrated in FIG. 19. Similarly, on the satisfaction of the second comparison the Y comparator 56 applies to the position tracking gate 52, via an intercoupling line 73, a Y selection pulse as shown at 72 in FIG. 13.

Coincident application of the wave forms 72 and 74 (FIGS. 13 and 19) to the tracking gate 52 is requisite for the opening of the latter, the point being that only the video information pertinent to the target acquired is admitted to the sampling device 54 for error control purposes. It is that target, selected by the stored or acquisition voltages in memory devices 63 and 64, which is tracked by the symbol.

The initial stored position voltages for the target display are compared with the coordinate voltages, generating time-related tracking gate pulses 72 and 74, and comparators 55 and 56 also generate ramps or error functions. Each error function is phased with the associated position tracking gate so that a target in the center of the gate, sampling the error function, causes zero error-signal input to the associated memory and integrator. A target not centered in the gate causes the associated error detector to transfer a polarized step error to the associated memory to cause the gate to center and the error sample to be zero. The step error inputs are integrated to obtain the correct rate functions of the target position voltages.

The target is tracked and maintained in time centrality with reference to the position tracking gate by servo or error-control techniques. That is to say, the error sampler 54 is provided with output lines 75 and 76, respectively coupled to error detecting devices 77 and 78, the respective functions of which are as follows: as to error detector 77, to detect the magnitude and polarity of any differential between the centrality of the gate and the target echo, X coordinate-wise, and apply to memory 63, via line 79, a correction suitable to render the stored X voltage appropriate to accomplish such centrality, X coordinate-wise; as to the error detector 78, to detect any similar deviation, Y coordinate-wise, between the centrality of the gate and the target echo as sampled by device 54, and to apply to the Y voltage storage device 64, via line 80, a suitable corrective increment or decrement appropriate to centralize the video echo in the gate, Y coordinate time-wise. In order that each error detector may have a basis upon which to determine such deviations from centrality, each comparator device is coupled, as by lines 81 and 82, to its associated error detector in order to apply thereto a discriminator type ramp function. It will be understood from prior art knowledge of tracking techniques such as are described in U.S. Patent 3,015,817, issued January 2, 1962, to J. J. Pastoriza, that the echo samples from device 54 are ideally centralized on the ramps or error functions appearing in lines 81 and 82—i.e., when tracking has been accomplished and is being maintained.

Suitable integrating circuits in storage devices 63 and 64 maintain the gate on target even when fading causes occasional failure of echo signals. Manual assist in the event of long sustained failures of this character is provided for corrective purposes by circuitry the output of which is indicated by the legends "NUDGE" in FIG. 1 and further described hereinbelow.

Assuming now that the position tracking gate is on target, let the discussion return to the placement of the symbol "A4" on target (FIG. 22).

Figures 9, 10, 11, 12:
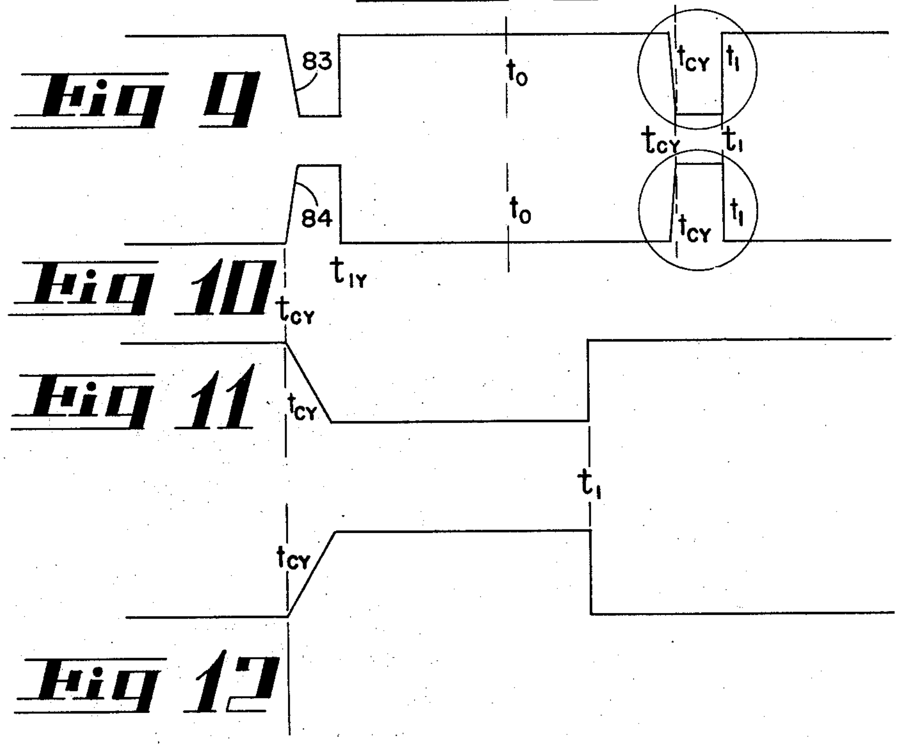

At each instant designated $t_{cy}$ in FIG. 8, the comparator 56, being provided with a suitable output circuit for this purpose, initiates, via the drive line 62, vertical deflection voltages in flying spot scanner 34, per the wave forms 83 and 84 illustrated in FIGS. 9 and 10, respectively, one figure designating the "push" and the other the "pull" of push-pull deflection. It will be understood that vertical deflections only will simply move the spot vertically on scanner 34 without modulating device 32. Similarly, at the instants $t_{cx}$ in FIG. 14, comparator device 55, being provided with suitable drive circuitry having an output line 61, will cause to be generated horizontal deflection voltages in scanner 34, as per the wave forms designated 86 and 87 in FIGS. 15 and 16. The flying spot scans and traverses the symbol only when both deflections are present. During those periods of time at which there is coincidence between the vertical and horizontal deflection currents in scanner 34, then the deflection modulation of scanner 34 is identical to the deflection modulation of the PPI 31, and phototube 32 is light-modulated to cause the desired transference of the symbol. The coincidence last referred to is ideally coincident in turn with the coincidence which opens tracking gate 52, whereby transference of the symbol is initiated when both of the aforementioned comparisons are satisfied.

The comparators mark the time when the X and Y coordinate voltages have reached the levels at which the deflection signals should be applied to the flying spot scanner, and at which the symbol should be transferred by intensity modulation of the PPI.

Attention is now invited specifically to FIGS. 20 and 24, which assume a target in the first quadrant. Let it be supposed that Line No. 1 on the PPI is being scanned. As the PPI beam, going radially outwardly, crosses imaginary line 40 (FIG. 20), a vertical deflection signal for the flying spot scanner is initiated by comparator 56, as indicated by curve $A_1$, FIG. 24. As the beam of the PPI passes line 39, comparator 55 produces horizontal deflecting signals for the flying spot scanner, as indicated by curve $B_1$, FIG. 24. Let us now consider Line No. 2 and so forth. With each successive line the beam traverses line 40 at a later relative time and line 39 at an earlier relative time, and this action is continued until and after Line No. 25 is swept. It will be noted in FIG. 24 that curves $A_2$, $A_3$, $A_4$, and $A_5$ are incrementally time-displaced to the right, or later, with relation to curve $A_1$. On the other hand, curves $B_2$, $B_3$, $B_4$, and $B_5$ are successively incrementally time-displaced to the left with relation to curve $B_1$. The Y scan leads until and inclusive of Line No. 12. On Line No. 13 the X and Y scans are initiated simultaneously. The X scan progressively increases its lead from Line No. 13 through Line No. 25. An X scan in the flying spot scanner occurs for every radial sweep of the PPI which passes the level of line 39. A Y scan occurs for every radial sweep of the PPI which passes the level of line 40. However, the scans are not used at all unless and until they time-overlap. They time-overlap when the PPI beam traverses gate zone 41. This operation is accomplished by a blanking gate 90 having inputs 91 and 92 from the two comparators, and having an output 93 coupled to an intensity control electrode of scanner tube 34, in such manner as to blank out the flying spot scanner beam except when there is an input from both comparators.

Now, Line No. 1 is not caused to be brightened at all by intensity modulation. Line No. 2 is caused to be brightened for a certain period indicated by the intensity gate $C_2$. Line No. 13 is brightened for the longest period of time, as indicated by the intensity gate $C_3$. The duration of the intensity gate decreases after Line No. 13, again going to zero for Line No. 25.

It will be seen that the behavior just described accords with FIG. 20, in that line No. 13 traverses the diagonal of zone 41. The intensity gates illustrated in FIG. 24 represent those changing (by PPI radial sweep) periods of time during which both horizontal and vertical scanning currents are being applied to the flying spot scanner. It should be noted that it is only during simultaneity of horizontal and vertical deflection currents in the flying spot scanner that the scanner intensity-modulates the PPI, as indicated by the intensity gate curves in FIG. 24. Interpreting FIG. 24 further, it should be noted that the slopes of $A_2$, $A_3$, $A_4$, and $A_5$ progressively decrease as compared to the $A_1$ slope. This may be verified by an inspection of FIG. 4. For targets in the first quadrant, with the PPI beam moving clockwise on successive sweeps, the pertinent resolved sweep being a cosine function, the slopes of the successive sawteeth progressively decrease. On the other hand, the slopes of the curves $B_2$, $B_3$, $B_4$, and $B_5$ progressively increase as compared to the $B_1$ slope, the pertinent resolved sweep being a sinusoidal function, as is confirmed by examination of FIG. 6. It should be borne in mind that curve $A_1$, for example, represents the excess of $R \cos \theta$ for Line No. 1 over the pertinent stored Y voltage, and curve $B_1$ represents the excess of $R \sin \theta$ over the stored X voltage. These excesses, having directional characteristics, are effectively exploited for deflection of the flying spot scanner, being converted into forms appropriate for linear scansions. FIG. 24 shows the durations of the time overlaps of the X and Y deflections of the flying spot scanner. The relative starting times of the two deflections are significant, and additionally their period of overlap, because the latter controls the duration of the intensity modulation of the PPI.

In FIG. 23 there is shown a comparator circuit which may be employed either in comparator device 55 or in comparator device 56. Comparator device 55 is illustrative, and FIG. 23 will be discussed on the supposition that it is descriptive of the contents of comparator 55.

The output 48 (FIG. 1) of resolver 46 is connected to the base or input circuit of the common-emitter-arranged NPN-type transistor 110 (FIG. 23), to apply to the latter wave form 69 (FIG. 14). The output line 65 of integrator 63 (FIG. 1) is connected to the base of NPN transistor 111 to place that base at level 70 (FIG. 14).

The emitters of transistors 110 and 111 are connected to the collector of a constant-current generator including NPN-type transistor 112. This transistor is provided with a base resistor 113 connected to ground, emitter resistor 114 connected to B− (negative terminal of a primary current source), and a resistance 120 in circuit between base and emitter. The collectors of transistors 110 and 111 are connected to collector load resistors 115 and 116. The junction of these two resistors and resistor 119 is connected to B+ (positive terminal of primary current source). The remaining terminal of resistance 119 is connected to the junction of the anodes of silicon rectifier diodes 117 and 118. The cathodes of these diodes are connected to the collectors of transistors 110 and 111.

When the comparison function is performed, wave form 69 traversing level 70 (FIG. 14), the FIG. 23 comparator generates wave forms 86 and 87 (FIGS. 15 and 16) respectively) at the collectors of transistors 111 and 110—i.e., on lines 61*b* and 61*a*, respectively, providing horizontal deflection voltages for the flying spot scanner tube 34. 61*a* and 61*b* in FIG. 23 constitute 61 in FIG. 1. The sloping front of wave form 86 (FIG. 15) provides the error function or ramp used in error detector 77 (FIG. 1). The junction of the anodes of diodes 117 and 118 rises in potential to provide the X selection gate 74 (FIG. 19). While this circuit has some resemblance to the differential amplifier 136 and diodes 436, 434 illustrated in FIG. 7 of the above-mentioned Pastoriza patent, the present circuit is transistorized and the output deflection voltages are always of the same amplitude. The present circuit therefore possesses unique advantages.

Figure 21:
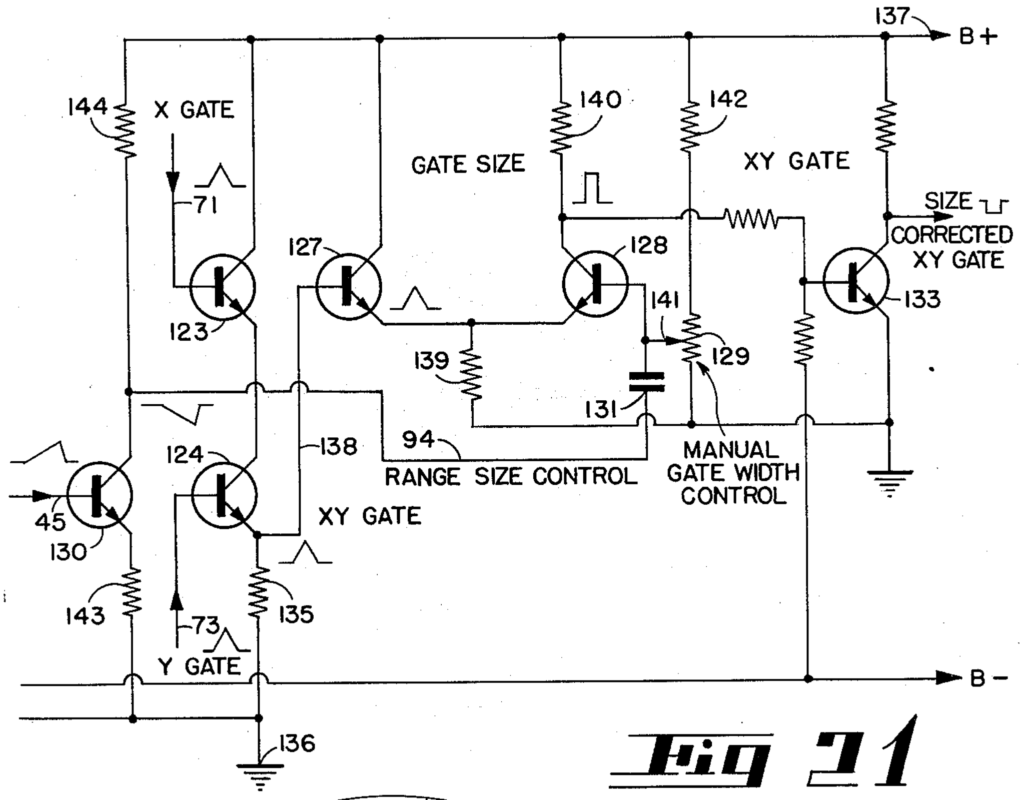
FIG. 21 is a circuit schematic of those portions of the position tracking gate circuit which are provided in accordance with the invention and which include an arrangement for controlling the size of the tracking gate in accordance with range.

The comparator outputs 71 and 73 and the position tracking gate generating circuit 52 of the present invention resemble the corresponding portions of the gate-generating matrix illustrated in FIG. 7 of the Pastoriza patent, it being understood that in the present invention there are a comparator 55 and a comparator 56 and a gate-generating circuit 52. The position gate-generating circuit 52, in accordance with the present invention, has significant points of novelty other than the fact that it is transistorized, and this gate-generator will now be described in detail. It is shown at block 52 in FIG. 1; some of its details are illustrated in FIG. 21.

The X selection gate line 71 and the Y selection gate line 73 (FIG. 1) are connected to the base inputs of transistors 123 and 124 (FIG. 21), respectively. Transistors 123 and 124 are NPN-type transistors arranged in series in the emitter-follower configuration, the emitter of 123 being connected to the collector of 124. The emitter of 124 is connected to a load resistor 135, the remaining terminal of which is grounded at 136. In order to provide reverse collector bias, the collector of transistor 123 is connected to the positive terminal of a suitable source of bias current (not shown), this terminal being indicated at 137. The transistors 123 and 124 function as a series "and" gate or coincidence detector, and are normally non-conducting. When the input pulses from the X and Y systems (designated 74 and 72 in FIGS. 19 and 13, respectively) are coincidentally applied to this coincidence detector, a triangular pulse of positive polarity appears at the emitter of transistor 124 and is applied, via line 138, to the base of NPN-type emitter-follower transistor 127. The collector of this transistor is reverse-biased by a connection to 137, and an emitter load resistor 139 is connected between its emitter and ground. Transistor 127 is normally cut off, but becomes conductive on the application of the positive triangular pulse from transistor 124. The emitter of transistor 127 is directly connected to the emitter of common-base-arranged transistor 128, so that, when coincidence occurs, a triangular pulse of positive polarity is applied to the emitter input circuit of transistor 128. Referring now further to transistor 128, its collector is connected in circuit with terminal 137 by collector load resistor 140, and fixed but adjustable base bias is provided by connecting the base through adjustable contact 141 to resistor 129, resistor 129 being part of a voltage divider comprising resistors 129 and 142 and connected in series between 137 and ground. Transistors 127 and 128 form an emitter-coupled clipper.

It will be seen from the foregoing that, upon the occurrence of coincidence, as detected by transistors 123 and 124, transistor 127 becomes conductive and transistor 128 becomes less conductive, generating a rectangular positive output pulse the effective width of which depends on the extent to which transistor 128 is driven toward non-conductivity. Now, it will be observed that a steady reverse bias is applied to the base of transistor 128 through contact 141. The greater this bias, the greater the non-conductivity reached by transistor 128, and accordingly the wider the output pulse appearing at the collector of transistor 128, this output pulse providing the position tracking gate. Contact 141 therefore functions as a manual gate width control, it being part of a potentiometer comprising the elements 129, 142, and 141.

In accordance with the present invention, there is further provided means for causing the width of this gate pulse automatically to vary as a function of range. For this purpose the range reference sawtooth is applied, via line 45, to a common-emitter-arranged NPN transistor 130, which simply inverts the sawtooth to provide a sawtooth of negative polarity. The biasing and load circuits for transistor 130 are provided in conventional fashion by emitter load resistor 143 and collector load resistor 144. The collector output of this stage is coupled by the range size control line 94 and capacitor 131 to the base of transistor 128. It has already been shown that the width of the output pulse of transistor 128 is functionally related to the drive of that transistor toward non-conductivity, so that the larger such drive the greater the effective width of the output pulse at the collector of transistor 128. Now, a negative sawtooth as applied to the base of transistor 128 drives that transistor toward non-conductivity. Coincidence occurs in a time relation to the time base provided by this sawtooth. Since the width of the collector output of transistor 128 is a function of a positive wave form applied to its emitter and a negative wave form applied to its base, both tending to drive the transistor toward non-conductivity, the level which determines the effective width of the output pulse of 128 depends on the point of time on said time base at which a positive pulse (indicative of coincidence) is applied to the emitter of transistor 128. That point of time in turn depends on the range of the target. Therefore it will be seen that the width of the output gate pulse of transistor 128 is made to vary automatically with range. The greater the range, the wider the pulse.

The output pulse appearing at the collector of transistor 128 is applied to the base input circuit of a common-emitter amplifier stage including transistor 133. This stage is arranged in conventional manner suitably to shape and amplify the gate pulse so that it appears at the collector output line of transistor 133 with suitable polarity and shaping to be applied to the error sampler 54 (FIG. 1).

The collector output of transistor 130 (FIG. 21) is indicated by the numeral 94, which corresponds to the numeral 94 in FIG. 1, and it will be understood that transistor 130 is included within the size control block designated 95 in FIG. 1.

The foregoing description has made clear that the symbol is displayed on the tracking gate, and the tracking gate tracks the target. This tracking gate should not be confused with what has been referred to as the "intensity gate" in the description of FIG. 24. In fact, there is no intensity gate mechanism or circuitry in the invention here described, the expression "intensity gate" being applicable only to the virtual gate caused by the time overlap between horizontal and vertical wave forms applied to the flying spot scanner, there being no transfer of symbol information to the PPI unless both wave forms are present. This is for the reason that the presence of both deflecting wave forms is requisite to the motion of the flying spot relative to the symbol on the mask 35—i.e., to the traversal of the symbol.

Reference is now made to FIG. 1. It will be noted that the memory devices 63 and 64 are provided with inputs bearing the legend "NUDGE." The details of nudge circuitry in accordance with the invention are indicated in FIG. 25. Let it be supposed that an observer notes that the alpha-numeric symbol is not on target but is located on the PPI radially inwardly of a target at 45°, for example. What is desired is to provide means for applying to the memory devices 63 and 64 increments of X and Y stored voltages so as to superimpose, by observation, the symbol on the target. The FIG. 25 circuit provides for this need. Under the hypothetical conditions assumed, the operator desires to move the symbol radially outwardly, and he wants the direction of the motion to be 45° and the displacement to be related to the magnitude of the correction. Accordingly, he sets a suitable heading device 150 to indicate 45°, and supplies to the input of a sine-cosine potentiometer 151 a voltage functionally related (by estimate) to the distance that he wants to move the symbol. The heading device simply supplies angle information to potentiometer 151. This voltage is resolved into X and Y components by the sine-cosine potentiometer 151, the latter being synchronized as to angularity with the heading device 150, whereupon the input voltage to potentiometer 151, which voltage is functionally related to the desired corrective symbol displacement, is broken down into X and Y components. The X component is applied, via line 152, through a switching arrangement to capacitor 153 to charge the latter. Similarly, the Y component is applied, via line 154 and switching circuitry, to capacitor 155 to charge that capacitor. The result is that appropriate X and Y voltages, to be applied to the memory devices, are placed in the storage capacitors 153 and 155. The remaining portion of FIG. 25 consists of the switching circuitry. When the observer desires to accomplish the above-mentioned superimposition, he closes a nudge switch 156, energizing a relay 157. This relay, through a suitable ganging expedient indicated by the reference numeral 158, controls two switches which function in this manner: when 157 is de-energized, the switches connect line 152 and ground to 153, and line 154 and ground to 155, permitting storage of voltages in 153 and 155. When relay 157 is energized by closing switch 156, blades 159 and 160 are switched from contacts 161 and 162 over to output contacts 163 and 164, respectively, coupling capacitor 153 to memory device 63 (FIG. 1), thereby adding an increment of X voltage to that stored in device 63. Similarly, blades 166 and 167 are displaced to output contacts 168 and 169, respectively, coupling capacitor 155 to memory device 64. The last-mentioned capacitor discharges to add an increment of Y voltage to that stored in the device 64. The resultant of the application of these X and Y increments is to cause the symbol correctively to be displaced so as again to be superimposed and to track the target indication on the PPI. It will be understood that these voltages, or either of them, could be a decrement, if that is required by the nature of the correction.

While there has been shown and described what is considered to be the preferred embodiment of the present invention, it will be understood by those skilled in the art that various modifications and changes may be made therein without departing from the scope of the invention as defined by the appended claims.

We claim:

1. The combination of:

a display device including a first cathode ray tube having an intensity control electrode and a beam provided with a radial sweep;

a flying spot scanning device including a second cathode ray tube and having a video output coupled to said electrode and also having horizontal and vertical deflecting elements;

and means for applying to said deflecting elements vertical deflecting signals functionally dependent on $R \cos \Theta$ and horizontal deflecting signals functionally dependent on $R \sin \Theta$ at instants related to and substantially at the time when the beam of the first-mentioned cathode ray tube device is displaced from its origin by an amount R and is angularly displaced by an angle $\Theta$ from an arbitrarily selected zero angle, the start of each deflection of the beam of the second tube being delayed with respect to the start of each sweep of the first tube.

2. The combination of:

a display device including a first cathode ray tube having an intensity control electrode and a beam provided with a radial sweep;

a flying spot scanning device including a second cathode ray tube having a beam and two sets of deflecting elements;

and means for applying to said deflecting elements, at instants when the beam of the first tube is displaced from its origin, deflecting signals cooperatively imparting to the beam of the second device motion in the same angular direction as characterizes the beam of the first cathode ray tube device, the start of each motion of the beam of the second tube being delayed with respect to the start of each sweep of the first tube.

3. The combination of:

a first cathode ray tube device providing a beam and having a radial sweep;

a second cathode ray tube device having a display face and a sweep projecting geometrically from a virtual origin located radially outwardly of its display face;

and means for angularly synchronizing said sweeps, including:

means for initiating the actual sweep of the second cathode ray tube device, entirely disposed within its display face, substantially at a time when the beam of the first-mentioned device is displaced from its origin by a predetermined amount, the displacement of said virtual origin from the center of the face of said second cathode ray tube device depending on said predetermined amount;

and means including a resolved sweep generator for effectively angularly positioning said virtual origin in accordance with the angular position of the first beam at the time of such initiation, whereby the sweeps of both tubes are directionally coordinated.

4. The combination of:

a first cathode ray tube plan position indicator device having a beam provided with a radial sweep and a control electrode responsive to a target echo to produce a pip;

a second cathode ray tube device having horizontal and vertical deflecting elements, said second tube device being a flying spot scanner having an output circuit coupled to said control electrode to intensity-modulate said beam;

means for effectively applying to the horizontal deflecting elements horizontal deflecting signals functionally dependent on a voltage $kt \sin \Theta$;

means for effectively applying to said vertical deflecting elements vertical deflecting signals functionally dependent on a voltage $kt \cos \Theta$;

sensing means for automatically delaying the first-mentioned application relative to the beginning of each radial sweep by a first predetermined voltage dependent on one coordinate of the position of said pip;

and sensing means for automatically delaying the second-mentioned application relative to the beginning of each radial sweep by a second predetermined voltage dependent on the other coordinate of the position of said pip;

whereby the deflections of the two cathode ray tube devices are in synchronism when the intensity-modulation occurs;

where:

$kt$ is a predetermined time displacement of said beam from its origin, and $\Theta$ is the angular displacement of said beam from an arbitrarily selected zero angle.

5. The combination of:

a first cathode ray tube plan position indicator device having a beam provided with a radial sweep and a control electrode responsive to a target echo to produce a pip;

means for providing resolved sweeps $kt \sin \Theta$ and $kt \cos \Theta$;

a second cathode ray tube device having horizontal and vertical deflecting elements, said second tube device being a flying spot scanner having an output circuit coupled to said control electrode to intensity-modulate said beam;

means for effectively applying to the horizontal deflecting elements the sinusoidal resolved sweep;

means for effectively applying to the vertical deflecting elements the cosinusoidal resolved sweep;

and sensing means for automatically delaying the respective applications of said sweeps by voltages analogous to the horizontal and vertical Cartesian coordinate of said pip, whereby the deflections of the two cathode ray tube devices are in synchronism when the intensity-modulation occurs;

where:

$kt$ is a predetermined time displacement of said beam from its origin, and

Θ is the angular displacement of said beam from an arbitrarily selected zero angle.

6. The combination of:

a cathode ray tube PPI display device having a beam provided with a radial sweep, said PPI device having also intensity modulation means;

means for providing resolved sweeps $kt$ sin Θ and $kt$ cos Θ;

a flying spot scanner device having horizontal and vertical deflecting elements and an object to be scanned, transferred, and displayed by intensity modulation of the PPI device, and an output circuit coupled to said intensity modulation means;

means for effectively applying to the horizontal deflecting elements of said flying spot scanner the sinusoidal resolved sweep;

means for effectively applying to the vertical deflecting elements of the flying spot scanner the cosinusoidal resolved sweep;

means for delaying the first-mentioned application by an X voltage;

and means for delaying the second-mentioned application by a Y voltage;

whereby the deflections of the beams of the PPI device and the flying spot scanner are in synchronism when the intensity modulation occurs;

where:

$kt$ is a predetermined time displacement of said beam from its origin,

Θ is the angular displacement of said beam from an arbitrarily selected zero angle, the X voltage is an analog of the horizontal component of the position of said object as displayed, and the Y voltage is an analog of the vertical component of the position of said object as displayed.

7. In a radar system having a time base, a cathode ray PPI display device having intensity modulation means and a beam provided with a radial sweep, and means for applying target echo information to the intensity modulation means, the combination of:

a flying spot scanner device having horizontal and vertical deflecting elements and an object to be scanned, transferred, and displayed by intensity modulation of the PPI device, and an output circuit coupled to said intensity modulation means;

first and second comparators coupled to the horizontal and vertical deflecting elements, respectively;

means synchronized by said time base for applying resolved sweeps $kt$ sin Θ and $kt$ cos Θ to said first and second comparators, respectively, to supply positional information relating to the displayed target to the comparators;

and means for applying to the comparators X and Y analog voltage data as to the desired position of the displayed object on the PPI device;

the first comparator equating the sinusoidal resolved sweep to the X analog voltage and then effectively applying the excess of $kt$ sin Θ over the X voltage to said horizontal deflecting elements, the second comparator equating the cosinusoidal resolved sweep to the Y voltage and then effectively applying the excess of $kt$ cos Θ over the Y voltage to the vertical deflecting elements;

both equating operations occurring substantially at the time of target echo display, whereby the positions of the target and the object as displayed on the PPI device are equated;

where:

$kt$ is a predetermined time displacement of said beam from its origin, and

Θ is the angular displacement of said beam from an arbitrarily selected zero angle.

8. In a radar system having a time base per claim 7, the combination in accordance with claim 7 in which the means for applying to the comparators analog voltage data comprises an X voltage storage device and a Y voltage storage device.

9. In a radar system per claim 8, the combination in accordance with claim 8 in which the first and second comparators produce first and second output gate pulses when performing their comparison functions, and including means for correcting the stored voltages to position the coincidence of said pulses in time symmetry relative to the reception of target echo radar video information.

10. In a radar system per claim 9, the combination in accordance with claim 9 in which the last-mentioned means comprises:

a position gate generating circuit which responds to said coincidence to pass target video information;

a sampler coupled to said gate generating circuit;

a first error detector for effectively measuring the centrality of samples of said passed video with regard to the first output gate pulse and for furnishing to the X voltage storage device a correction voltage dependent in magnitude and polarity on the deviation from centrality;

and a second error detector for determining the centrality of samples of said target video information with respect to the second output gate pulse and for furnishing to the Y voltage storage device a correction voltage dependent in magnitude and polarity on the deviation from centrality;

whereby the display of the target on the PPI device is tracked by the display of the object on the PPI.

11. In a radar system per claim 10, the combination in accordance with claim 10 in which the position gate generating circuit comprises a variable-level clipper and means for applying a range sawtooth reference wave form to said clipper automatically to establish its clipping level, whereby the width of the pulse output wave form of the position gate is functionally related to target range.

12. In a radar system per claim 11, the combination in accordance with claim 11 and means for manually superimposing the object display on the target display, comprising:

a sine-cosine potentiometer having inputs corresponding to a desired correctional displacement of the object display and the angle of said displacement, and output voltages functionally related to the X and Y coordinates of the desired displacement;

capacitor means for storing said voltages;

and manually controlled switching means for applying said stored voltages to the X and Y storage devices.

13. The combination of:

a PPI target display device having a radial sweep and beam intensity control means and adapted to display as a pip a target having vertical and horizontal positional coordinates, a flying spot scanner having horizontal and vertical deflecting elements providing a controlled sweep and a scanned medium having a radiation transmission characteristic pattern and a video output circuit coupled to said beam intensity control means, and electronic means, including means for supplying to said scanner device vertical control components and horizontal control components separately indicative of the vertical and horizontal positional coordinates of the pip to control its sweep, for angularly synchronizing the flying spot scan and those portions of the PPI sweep covering the pip.

14. The combination of:

a PPI target display device having a radial sweep and beam intensity control means;

a flying spot scanner device having horizontal and vertical deflecting elements and a scanned medium having a radiation transmission characteristic pattern and a video output circuit coupled to said beam intensity control means;

and means for coordinating the display of a target zone and the display of the scanned medium on the PPI device, comprising:

a first storage device for providing a stored X voltage, a second storage device for providing a stored Y voltage, means synchronized with the PPI radial sweep to provide resolved sweeps $kt \sin \Theta$ and $kt \cos \Theta$, a first comparator for comparing the resolved sweep $kt \sin \Theta$ and the stored X voltage to effectively convert the resolved sweep $kt \sin \Theta$ into horizontal deflection modulation waves for the flying spot scanner substantially as each sweep $kt \sin \Theta$ traverses the level of the X stored voltage, and a second comparator for comparing the resolved sweep $kt \cos \Theta$ and the stored Y voltage to effectively convert the resolved sweep $kt \cos \Theta$ into vertical deflection modulation waves for the flying spot scanner substantially as each sweep $kt \cos \Theta$ traverses the level of the Y stored voltage, where:

the X stored voltage is the analog of the horizontal position of the display of the scanned medium on the PPI target display device, the Y stored voltage is the analog of the vertical position of such medium on the PPI target display device, $kt$ is the instantaneous range parameter of the radial sweep, and $\Theta$ is the instantaneous azimuthal position of the radial sweep.

15. The combination as defined in claim 14, together with:

means responsive to the coincident operation of both comparators to provide a target position gate, and error detector means for measuring the deviations of target echo signals from time symmetry with respect to the target position gate and applying to the voltage storage devices corrections requisite to maintain such symmetry.

16. The combination comprising:

a cathode ray tube PPI display device having a screen, deflection means for sweeping the beam of said cathode ray tube over said screen in polar dimensions, and intensity control means for said beam;

a flying spot scanner providing a beam of radiant energy;

a radiant energy sensitive device for producing an output responsive to the intensity of said beam of radiant energy intercepted thereby, said output being applied to said intensity control means;

a medium having a radiation transmission characteristic pattern, said pattern representing a symbol, said medium being interposed between said beam of radiant energy and said radiant energy sensitive device;

means providing horizontal and vertical deflecting components for sweeping said beam of radiant energy over said medium, the radial sweep of said beam of radiant energy being synchronized with the radial sweep of the beam of said cathode ray tube;

and means for initiating the components of the sweep of said beam of radiant energy across said medium when the radial sweep of the beam of the cathode ray tube PPI display device is substantially displaced from its origin.

17. In a device of the character described, a gate generating system comprising:

a coincidence detector for providing a triangular pulse of positive polarity on coincidence of two input pulses;

a range reference generator for providing a sawtooth pulse;

and means for combining said triangular pulse and said sawtooth pulse to provide a clipped output gate pulse, the effective width of which automatically increases in accordance with the instantaneous amplitude of said sawtooth pulses at the time that said coincidence occurs.

18. The method of flying spot scanner transference of a symbol to a PPI display device which comprises the steps of:

continuously separately comparing two resolved sweeps with Cartesian coordinate symbol-display analog voltages, and deflection-modulating the scanner in accordance with the slopes of the sweep wave forms at the times that the comparisons indicate equated conditions.

References Cited by the Examiner

UNITED STATES PATENTS

| | | | |
|---|---|---|---|
| 2,610,319 | 9/52 | Page | 343—11 |
| 2,622,240 | 12/52 | Fleming-Williams | 343—5 |
| 2,640,984 | 6/53 | Sherwin | 343—11 |
| 2,775,757 | 12/56 | Ellsworth et al. | 343—11 |
| 2,917,737 | 12/59 | Close et al. | 343—7.3 |
| 2,935,744 | 5/60 | Foy | 343—5 |
| 2,991,464 | 7/61 | Greenfield | 343—11 |
| 3,017,628 | 1/62 | Landee et al. | 343—5 |

FOREIGN PATENTS

| | | |
|---|---|---|
| 601,025 | 7/60 | Canada. |

CHESTER L. JUSTUS, *Primary Examiner.*

UNITED STATES PATENT OFFICE

CERTIFICATE OF CORRECTION

Patent No. 3,158,858 November 24, 1964

Jack R. Ragen et al.

It is hereby certified that error appears in the above numbered patent requiring correction and that the said Letters Patent should read as corrected below.

Column 3, line 26, for "modulaiton" read -- modulation --; column 12, line 57, for "16)" read -- 16, --; column 16, line 70, for "coordinate" read -- coordinates --.

Signed and sealed this 13th day of April 1965.

(SEAL)
Attest:

ERNEST W. SWIDER
Attesting Officer

EDWARD J. BRENNER
Commissioner of Patents